US009711981B2

(12) United States Patent
Sun (10) Patent No.: US 9,711,981 B2
(45) Date of Patent: Jul. 18, 2017

(54) MOBILE POWER SUPPLY, CHARGING BASE AND SUPERIMPOSED CHARGING PLATFORM

(71) Applicant: Shenzhen Wistek Energy Co., Ltd., Shenzhen (CN)

(72) Inventor: Hui Sun, Shenzhen (CN)

(73) Assignee: Shenzhen Wistek Energy Co., Ltd., Shenzhen (CN)

( * ) Notice: Subject to any disclaimer, the term of this patent is extended or adjusted under 35 U.S.C. 154(b) by 161 days.

(21) Appl. No.: 14/743,033

(22) Filed: Jun. 18, 2015

(65) Prior Publication Data

US 2016/0043584 A1    Feb. 11, 2016

(30) Foreign Application Priority Data

Aug. 7, 2014    (CN) ...................... 2014 2 0444690 U (51) Int. Cl.
*H02J 7/00*    (2006.01)
*H01M 2/10*    (2006.01)

(52) U.S. Cl.
CPC ......... *H02J 7/0042* (2013.01); *H01M 2/1044* (2013.01)

(58) Field of Classification Search
CPC .................................................. H02J 7/0042
USPC ....................................................... 320/107
See application file for complete search history.

(56) References Cited

U.S. PATENT DOCUMENTS

| 6,463,263 B1* | 10/2002 | Feilner ................. H04B 1/3816 455/348 |
| 7,741,808 B2* | 6/2010 | Fowler .................. B62B 3/1424 320/107 |
| 7,977,806 B2* | 7/2011 | Kim ...................... H02K 7/1846 290/1 C |
| 2006/0153618 A1* | 7/2006 | Fries ...................... B41J 3/4075 400/88 |
| 2013/0319902 A1* | 12/2013 | Tufi ........................ A61J 1/035 206/534 |

* cited by examiner

*Primary Examiner* — Yalkew Fantu
(74) *Attorney, Agent, or Firm* — Duane Morris LLP (57) ABSTRACT

A mobile power supply includes an upper and lower shells, both of which are attached to each other to form a housing of the mobile power supply. A first PCB and a storage battery connected with the first PCB are disposed within the housing. An upper cover is provided at the top of the upper shell. A lower cover is provided at the bottom of the lower shell. A first and second conductive poles, which pass through the upper and lower covers and are both connected with the first PCB, are vertically disposed apart from each other within the housing. Top ends of the first and second conductive poles form first snap button structures with the upper cover, respectively. Bottom ends of the first and second conductive poles form first buckling structures with the lower cover, respectively, the first buckling structures match with the first snap button structures, respectively.

9 Claims, 7 Drawing Sheets

MOBILE POWER SUPPLY, CHARGING BASE AND SUPERIMPOSED CHARGING PLATFORM

CROSS-REFERENCES TO RELATED APPLICATION

This application claims the priority to a Chinese patent application No. 201420444690.5 filed on Aug. 7, 2014 and entitled "MOBILE POWER SUPPLY, CHARGING BASE AND SUPERIMPOSED CHARGING PLATFORM", which is incorporated herein by reference in its entirety.

TECHNICAL FIELD

The present disclosure relates to the field of mobile power supply technologies, in particular, to a mobile power supply, a charging base (i.e. a charging dock) and a superimposed charging platform.

TECHNICAL BACKGROUND

Digital electronic products such as mobile phones, digital cameras and palmtops have become necessities of life. However, when these products cannot operate normally due to low battery, it is necessary for these products to be charged as soon as possible in order to resume normal operations. Therefore, the battery life has attracted lots of attentions in using the digital electronic products.

Further, existing mobile power supplies mostly are independently charged, which represents a traditional charging manner inapplicable to simultaneous charging of a plurality of the mobile power supplies, resulting in a very low charging efficiency. Therefore, it is difficult to meet the charging demands especially in the case that a plurality of the mobile power supplies are empty of power. In addition, to charge the digital electronic product at home, a suitable charging cable and a charging plug are required, but it is typically annoying in finding small articles such as the charging cable and the charging plug from a mass of stuff. Moreover, all of the mobile power supply, the charging cable, the charging plug, and so on shall be carried for a trip, and hence not only occupy much space in a bag, but also likely make the bag messy due to the cable, thus the charging cable and the charging plug in the bag become difficult to be found and easy to be forgotten.

SUMMARY OF THE INVENTION

A first object of the present disclosure is to propose a mobile power supply which has a simple structure and is easy to use, and a plurality of the mobile power supplies can be simultaneously charged together.

A second object of the present disclosure is to propose a charging base for charging the mobile power supply, and the charging base has a simple structure and a high charging efficiency, and is easy to use.

A third object of the present disclosure is to propose a superimposed charging platform, which can achieve simultaneous charging of a plurality of the mobile power supplies with a high charging efficiency, has a simple structure and is compact.

To achieve these objects, the present disclosure adopts the following technical solutions.

A mobile power supply includes an upper shell and a lower shell which are attached to each other to form a housing of the mobile power supply, and a first PCB and a storage battery connected with the first PCB being disposed within the housing. An upper cover is provided at the top of the upper shell while a lower cover is provided at the bottom of the lower shell, a first conductive pole and a second conductive pole, which pass through the upper and lower covers and are both connected with the first PCB, are vertically disposed apart from each other within the housing, top ends of the first and second conductive poles form first snap button structures with the upper cover, respectively, bottom ends of the first and second conductive poles form first buckling structures with the lower cover, respectively, and the first buckling structures match with the first snap button structures, respectively.

A first recess and a second recess each having a conical shape are disposed separately at an external surface of the upper cover, a first protrusion and a second protrusion are disposed at an external surface of the lower cover, as top end of the first conductive pole passes through the first recess without protruding from the external surface of the upper cover, a top end of the second conductive pole passes through the second recess without protruding from the external surface of the upper cover, and the top ends of the first and second conductive poles form the first snap button structures with the first and second recesses, respectively the bottom end of the first conductive pole passes through the first protrusion without protruding from the first protrusion, the bottom end of the second conductive pole passes through the second protrusion without protruding from the second protrusion, and the bottom ends of the first and second conductive poles form the first buckling structures with the first and second protrusions, respectively.

A third recess is disposed at the external surface of the upper cover, the first, second and third recesses are respectively located, at three vertexes of a triangle, at third protrusion, which matches with the third recess, is disposed on the external surface of the lower cover, the third recess is configured to form a second snap button structure, heat emission holes opening to the external are disposed in the third protrusion, and the third protrusion is configured to form a second buckling structure matching with the second snap button structure; and a switch button, a top end of which is corresponding to the third recess, is disposed on the first PCB.

At least two receiving grooves are formed at a lateral side of the housing, two receptacles are respectively disposed at both ends of each receiving groove, a USB interface connecting with the first PCB is disposed within one of the two receptacles at both ends of each of the receiving grooves; a detachable charging cable is disposed within each of the receiving grooves, with both ends of the charging cable being respectively disposed within the corresponding receptacles, and one end of the charging cable is provided with a USB plug configured to connect with the USB interface while the other end of the charging cable is provided with a charging plug adapted to a charging interface of an external device to be charged, a micro USB interface, which is adapted to a charging plug of at least one of the charging cables and is configured for charging the mobile power supply, is disposed at the lateral side of the housing, and the micro USB interface is connected with the first PCB.

An indicator light connecting with the first PCB is disposed at the lateral side of the housing to indicate a charging state of the mobile power supply, the indicator is disposed opposite to the micro USB interface, and the upper shell, the first PCB and the lower shell are connected together by first screws.

A first receiving groove and a second receiving groove are disposed at the lateral side of the housing, a first receptacle extending through the housing is disposed at one end of the first receiving groove, a second USB interface connecting with the first PCB is disposed in the first receptacle, a second receptacle is disposed at the other end of the first receiving groove, a first charging cable is placed within the first receiving groove, a first USB plug is disposed at one end of the first charging cable while a first charging plug is disposed at the other end of the first charging cable, the first USB plug is disposed in the first receptacle and is connected with the second USB interface, and the first charging plug is disposed in the second receptacle;

a third receptacle extending through the housing is disposed at one end of the second receiving groove, and a first USB interface connecting with the first PCB is disposed in the third receptacle, a fourth receptacle is disposed at the other end of the second receiving groove, a second charging cable is placed within the second receiving groove, a second USB plug is disposed at one end of the second cable while a second charging plug is disposed at the other end of the second cable, the second USB plug is disposed in the third receptacle and is connected with the first USB interface, and the second charging plug is disposed in the fourth receptacle.

A charging base for a mobile power supply includes a body. A top cover is disposed in an inner chamber of the body, a second PCB is disposed below the top cover, a first contactor and a second contactor passing through the top cover are disposed vertically within the body, bottom ends of the first contactor and the second contactor are connected with the second PCB, and top ends of the first contactor and the second contactor form third snap button structures with the top cover, respectively;

the first buckling structures at the bottom of the mobile power supply are configured to engage with the third snap button structures at the top of the charging base, respectively, so that the bottom ends of the first conductive pole and the second conductive pole are connected with the first contactor and the second contactor respectively, to charge the mobile power supply.

A first recess and a second recess each having a conical shape are disposed separately at an external surface of the top cover, the top ends of the first contactor and the second contactor form the third snap button structures with first recess and second recess, respectively.

A third recess is disposed at the external surface of the top cover, the first, second and third recesses are respectively located at three vertexes of a triangle, and the third recess is configured to form a fourth snap button structure matching with the second buckling structure;

a charging interface for connecting with an external power cable is disposed at one side of the body while a power switch button is disposed at another side of the body, the charging interface and the power switch button are both connected with the second PCB, and a balancing weight is disposed at the inner bottom surface of the body.

A superimposed charging platform includes the charging base and a plurality of mobile power supplies superimposed on the charging base. A first buckling structure and a second buckling structure at the bottom of the underlying mobile power supply are engaged with the third snap button structure and the fourth snap button structure of the charging base, two adjacent mobile power supplies are engaged together by engaging the first buckling structure and the second buckling structure at the bottom of one of the adjacent mobile power supplies with the first snap button structure and the second snap button structure at the top of the other of the adjacent mobile power supplies, respectively.

The beneficial effects of the present disclosure lie in that: in the mobile power supply, the charging base and the superimposed charging platform provided in the present disclosure, the first conductive pole and the second conductive pole, which pass through the upper and lower covers and are both connected with the first PCB, are vertically disposed apart from each other within the housing of the mobile power supply; the top ends of the first and second conductive poles form the first snap button structures with the upper cover, respectively, the bottom ends of the first and second conductive poles form the first buckling structures with the lower cover, respectively, and the first buckling structures match with the first snap button structures, respectively; the first contactor and the second contactor, which pass through the top cover, are disposed vertically within the body of the charging base, the bottom ends of the first contactor and the second contactor are connected with the second PCB, and the top ends of the first contactor and the second contactor form third snap button structures with the top cover, respectively; when the mobile power supplies are superimposed and charged on the charging base, the first buckling structure and the second buckling structure at the bottom of the underlying mobile power supply are engaged with the third snap button structure and the fourth snap button structure of the charging base, two adjacent mobile power supplies are engaged together by engaging the first buckling structure and the second buckling structure at the bottom of one of the adjacent mobile power supplies with the first snap button structure and the second snap button structure at the top of the other of the adjacent mobile power supplies, respectively, so that the bottom end of the first conductive pole of the underlying mobile power supply is in contact with the first contactor and the bottom end of the second conductive pole of the underlying mobile power supply is in contact with the second contactor, and the adjacent mobile power supplies are connected with each other by the first and second conductive poles. By this way, the simultaneously charging of a plurality of the mobile power supplies is achieved, the mobile power supply may be charged as soon as it is placed on the charging base, and may be used as soon as it has been removed from the charging base, thereby facilitating greatly its usage; further, the charging platform has a high charging efficiency, and has a simple and compact structure and hence occupies small space. The mobile power supply has to simple structure and a plurality of the mobile power supplies are applicable to be simultaneously charged, resulting in usage convenience. The charging base has a simple structure, is easy to use and has a high charging efficiency. Thereby, the superimposed charging platform, which includes the charging base and superimposed mobile power supplies for charging, can achieve the simultaneously charging of a plurality of the mobile power supplies at a high charging efficiency, and have a simple and compact structure, and occupy small space.

The mobile power supply is connected with an external charging structure by the first and second conductive poles 7 and 8 so as to be charged. Further, the mobile power supplies may be superimposed for charging, so that the charging is more flexible and more convenient in use, and the charging efficiency can be effectively improved. Certainly, the upper shell 1 and the upper cover 3 may be formed separately or as one piece. Similarly, the lower shell 2 and the lower cover 9 may be formed separately or as one piece, which does not affect the charging manner of the mobile power supply.

Further, a first recess 301 and a second recess 302 each having a conical shape are disposed separately at the external surface of the upper cover 3, and a first protrusion 901 and a second protrusion 902 are disposed on the external surface of the lower cover 9. The top end of the first conductive pole 7 passes through the first recess 301 without protruding from the external surface of the upper cover 3, the top end of the second conductive pole 8 passes through the second recess 302 without protruding from the external

| A list of the reference numerals: | | |
|---|---|---|
| 1: Upper shell; | 2: Lower shell; | 3: Upper Cover; |
| 4: First Charging Cable; | 5: Second Charging Cable; | 6: Indicator Light; |
| 7: First Conductive pole; | 8: Second Conductive pole; | 9: Lower Cover; |
| 10: Micro USB Interface; | 11: First Receiving groove; | |
| 12: Second Receiving groove; | 13: First PCB; | 14: Storage Battery; |
| 15: First Screw; | 16: Body; | 17: Top Cover; |
| 18: First Contactor; | 19: Second Contactor; | 21: Power Line; |
| 22: Power Switch Button; | 23: Second PCB; | 24: Balancing Weight; |
| 100: Mobile Power; | 200: Charging Base; | 101: First Connecting Hole; |
| 102: First Via Hole; | 103: Second Via Hole; | 104: Via Hole; |
| 105: Receiving Hole; | 201: Battery Tank; | |
| 202: Second Connecting Hole; | 301: First Recess; | 302: Second Recess; |
| 303: Third Recess; | 401: First USB Plug; | |
| 402: First Charging Plug; | 403: First Supporting Arm; | 501: Second USB Plug; |
| 502: Second Charging Plug; | 503: Second Supporting Arm; | 901: First Protrusion; |
| 902: Second Protrusion; | 903: Third Protrusion; | 1101: First Receptacle; |
| 1102: Second Receptacle; | 1103: First Clamping notch; | 1201: Third Receptacle; |
| 1202: Fourth Receptacle; | 1203: Second Clamping notch; | 1301: Third Connecting Hole; |
| 1302: Third Via Hole; | 1303: Fourth Via Hole; | 1304: First USB Interface; |
| 1305: Second USB Interface; | 1306: Switch; | 1701: First Recess; |
| 1702: Second Recess; | 1703: Third Recess. | |

DETAILED DESCRIPTION OF THE PREFERRED EMBODIMENT

The technical solution of the present disclosure will be further described by way of embodiments below in conjunction with the accompanying drawings.

As shown in FIGS. 1 to 5, a mobile power supply includes an upper shell 1 and a lower shell 2, which are attached to each other to form a housing of the mobile power supply. A first Printed Circuit Board (PCB) 13 and a storage battery 14 connected with the first PCB 13 are disposed within the housing. An upper cover 3 is provided at the top of the upper shell 1 while a lower cover 9 is provided at the bottom of the lower shell 2. A first conductive pole 7 and a second conductive pole 8, which pass through the upper and lower covers 3 and 9 and are both connected with the first PCB 13, are vertically disposed apart from each other within the housing. The top ends of the first and second conductive poles 7 and 8 form first snap button structures (e.g. male snap button structures) with the upper cover 3, respectively, and the bottom ends of the first and second conductive poles 7 and 8 form first buckling structures (e.g. female snap button structures) with the lower cover 9, respectively, where the first buckling structures match with the first snap button structures, respectively.

surface of the upper cover 3, and the top ends of the first and second conductive poles 7 and 8 form the first snap button structures with the first and second recesses 301 and 302, respectively. The bottom end of the first conductive pole 7 passes through the first protrusion 901 without protruding from the first protrusion 901, the bottom end of the second conductive pole 8 passes through the second protrusion 902 without protruding, from the second protrusion 902, and the bottom ends of the first and second conductive poles 7 and 8 firm the first buckling structures with the first and second protrusions 901 and 902, respectively.

Still further, a third recess 303 is disposed at the external surface of the upper cover 3, and the first, second and third recesses 301, 302 and 303 are respectively located at three vertexes of a triangle. A third protrusion 903, which matches with the third recess 303, is disposed on the external surface of the lower cover 9. The third recess 303 forms a second snap button structure. Heat emission holes opening to the external are disposed in the third protrusion 903, and the third protrusion 903 forms a second buckling structure matching with the second snap button structure. A top end of a which button 1306 disposed on the first PCB 13 is corresponding to (i.e. aligns with) the third recess 303. Actually, when the mobile power supplies are superimposed for charging together simultaneously, the first snap button structure and the second snap button structure at the top of an mobile power supply are snap connected with the first buckling structure and the second buckling structure at the bottom of the other mobile power supply, respectively, thereby connecting the mobile power supplies. Moreover, the snap connections are located, at three vertexes of a triangle, so that the connection between the mobile power supplies is stable, thus ensuring stability of the charging.

Certainly, the first and second buckling structures as well as the first and second snap button structures may be decreased or increased as required, for example, thereby forming two or four snap connections, but not limiting to the three snap connections at three vertexes of a triangle.

In an implementation, at least two receiving grooves are formed at the lateral side of the housing of the mobile power supply, and two receptacles are respectively disposed at both ends of each receiving groove, where a Universal Serial Bus (USB) interface connecting with the first PCB 13 is disposed within one of the two receptacles at both ends of each receiving groove. A detachable charging cable may be disposed within each of the receiving grooves, with both ends of the charging cable being respectively disposed within the corresponding receptacles. One end of the charging cable is provided with a USB plug configured to connect with the USB interface, while the other end of the charging cable is provided with a charging plug adapted to a charging interface of an external device to be charged. A micro USB interface 10, which is adapted to a charging plug of at least one of the charging cables and is configured for charging the mobile power supply, is disposed at the lateral side of the housing, and the micro USB interface 10 is connected with the first PCB 13.

When the mobile power supply is used for charging the external device, the USB plug is connected with the first PCB 13, and the charging plug is connected with the charging interface of the external device.

To charge the mobile power supply per se, the charging plug of one of the charging cables, which matches with the micro USB interface 10, is connected with the micro USB interface 10, while the USB plug of the charging cable is connected with an external power.

As such, at least two receiving grooves for receiving charging cables are disposed at the lateral side of the housing of the mobile power supply. When the charging cable is not in use, the USB plug at one end of the charging cable is placed in the corresponding receptacle within a receiving groove and is connected with the USB interface in this receptacle, while the charging plug at the other end of the charging cable is placed in the other corresponding receptacle within the receiving groove. To charge an external device, the charging plug at the other end of the charging cable is pulled out from the receptacle and then connected with a charging interface of the external device. When the charging is finished, the charging plug of the charging cable is disconnected from the charging interface of the external device and then inserted into the corresponding receptacle. Therefore, this charging operation is simple, and the mobile power supply has a compact structure, and is easy for storage and carrying. Moreover, when a plurality of the external devices need to be charged simultaneously, each of the charging cables may be used for each of the external devices, thus enhancing greatly the charging efficiency and meeting the demand for the simultaneously charging of a plurality of the external devices. Besides, considering that the micro USB interface which is adapted to the charging plug of one of the charging cables and configured for charging the mobile power supply per se is disposed at the lateral side of the housing, in order to charge the mobile power supply per se, the charging cable having the charging plug adapted to the micro USB interface is drawn out from the receiving groove, and then the charging plug of the charging cable is inserted into the micro USB interface while the USB plug of the charging cable is connected with the external power, so that the mobile power supply is charged. Further, the charging plugs of the various charging cables may be adapted to different specifications suitable for charging interfaces of different types of mobile phones, so long as one of the charging plugs matches with the micro USB interface. In this way, the simultaneous charging of a plurality of external devices with charging interfaces meeting different specifications can be implemented. Thus, the charging cable can be used in a diversified way because it can not only be used for the charging of the external device, but be used for charging the mobile power supply per se.

Figure 1:
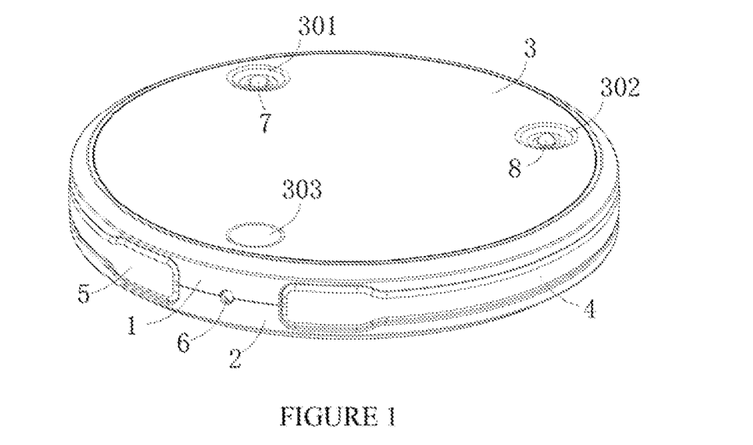
FIG. 1 is a schematic front perspective view showing the structure of a mobile power supply according to an embodiment of the present disclosure.
Figure 2:
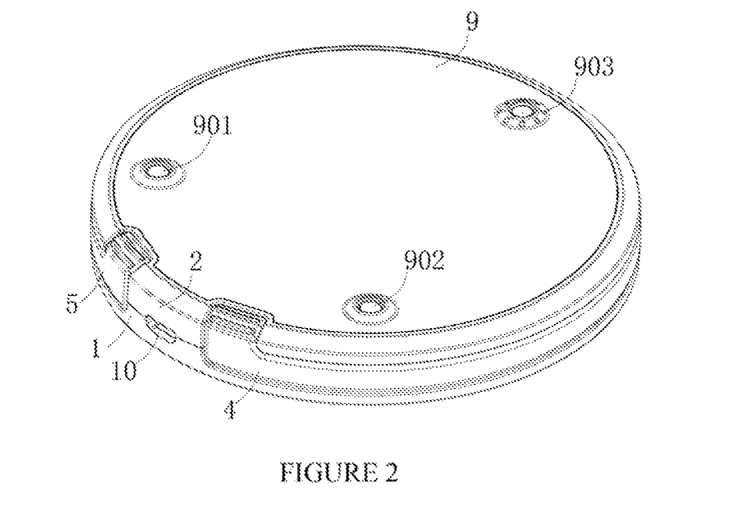
FIG. 2 is a schematic rear perspective view showing the structure of the mobile power supply in FIG. 1.
Figure 3:
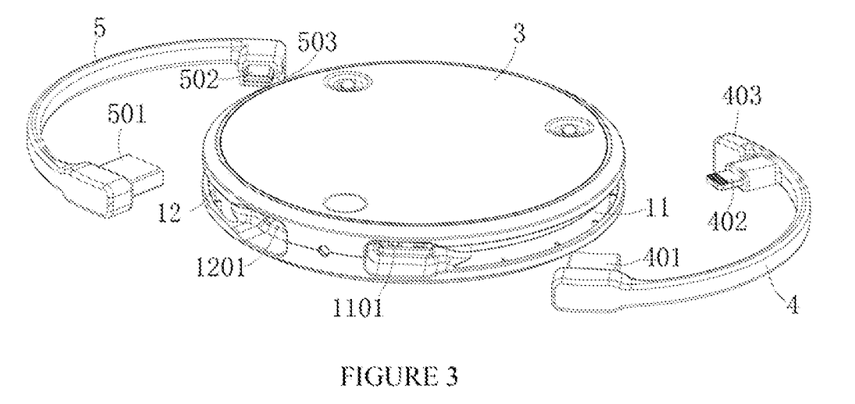
FIG. 3 is a schematic partially-exploded view of the mobile power supply shown in FIG. 1.
Figure 4:
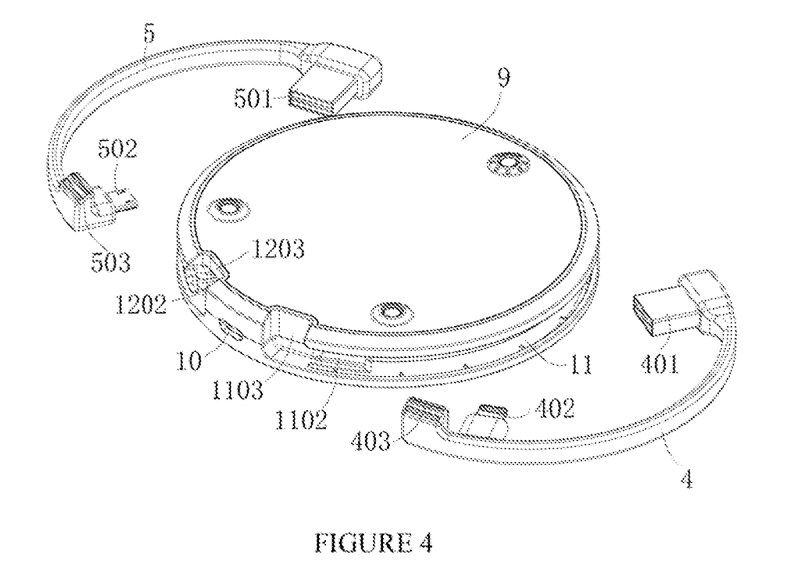
FIG. 4 is a schematic partially-exploded view of the mobile power supply shown in FIG. 2.
Figure 5:
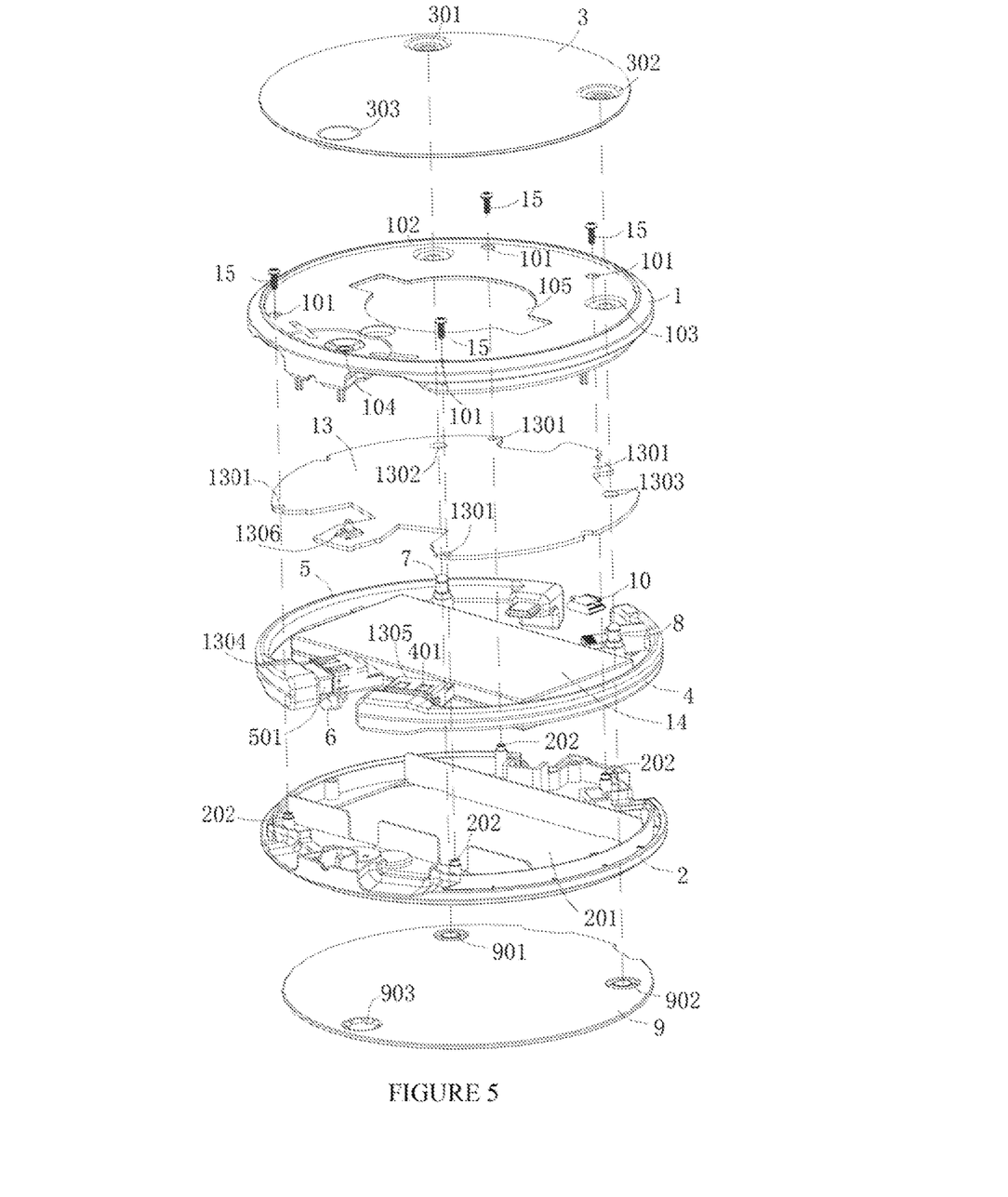
FIG. 5 is a schematic exploded view of the mobile power supply shown in FIG. 1.
Figure 6:
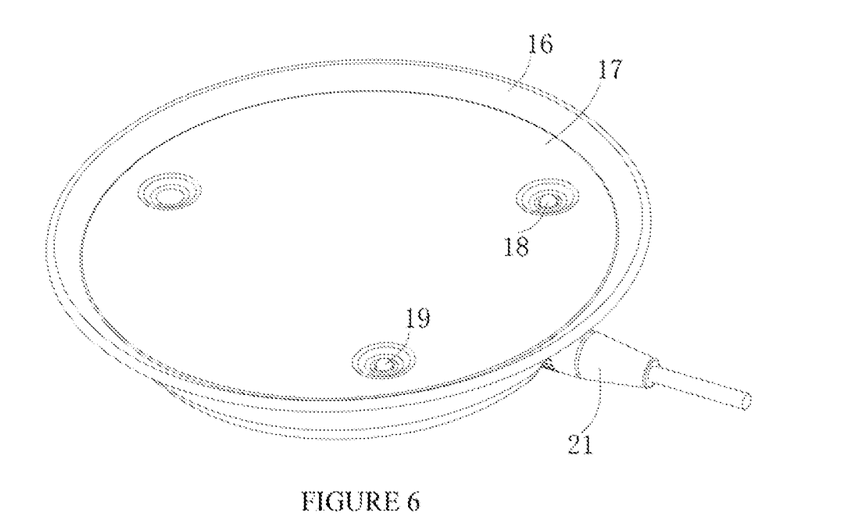
FIG. 6 is a first schematic view showing the structure of a charging base according to an embodiment of the present disclosure.
Figure 7:
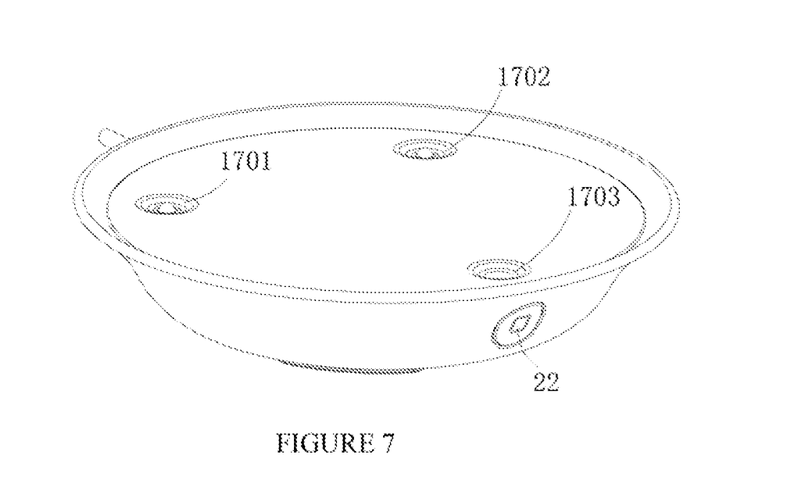
FIG. 7 is a second schematic view showing the structure of the charging base shown in FIG. 6.
Figure 8:
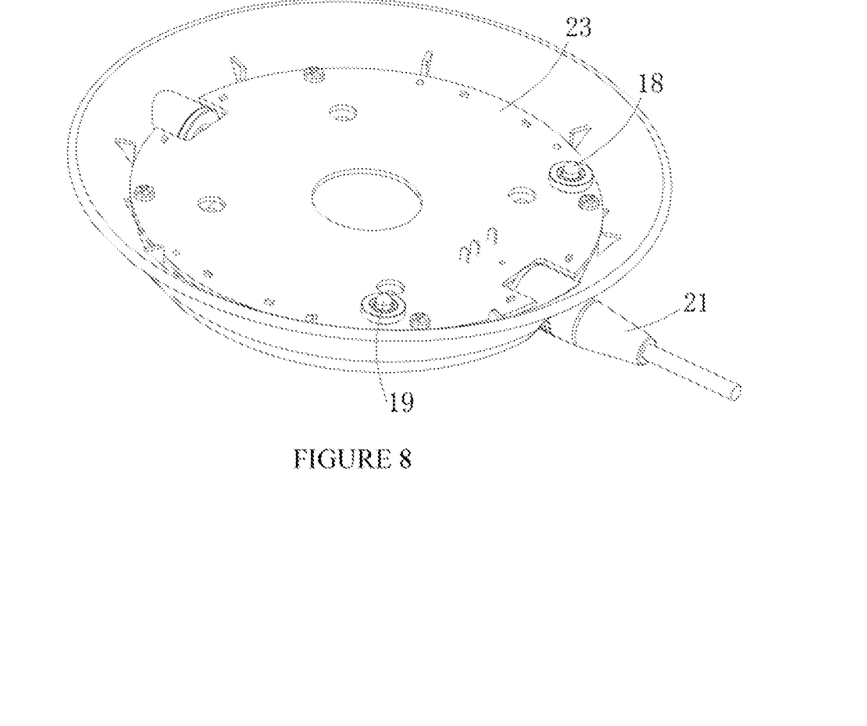
FIG. 8 is a schematic view showing the structure of the charging base shown in FIG. 6, with a top cover being removed.
Figure 9:
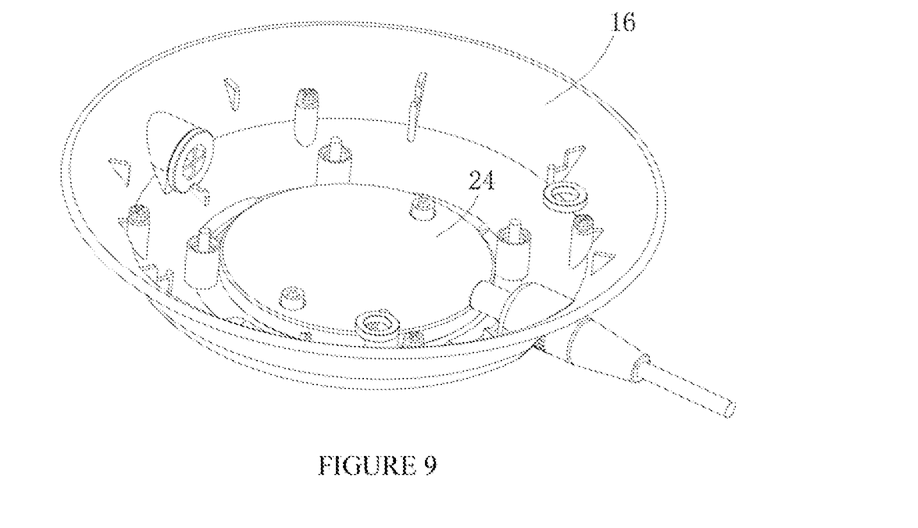
FIG. 9 is a schematic view showing the structure of the charging, base shown in FIG. 8, with a second PCB being removed.

More particularly, as shown in FIGS. 3 and 4, a first receiving groove 11 and a second receiving groove 12 are disposed at the lateral side of the housing of the mobile power supply. A first receptacle 1101 extending through the housing is disposed at one end of the first receiving groove 11, and a second USB interface 1305 connecting with the first PCB 313 is disposed in the first receptacle 1101. A second receptacle 1102 is disposed at the other end of the first receiving groove 11. A first charging cable 4 is placed within the first receiving groove 11. A first USB plug 401 is disposed at one end of the first charging cable 4, while a first charging plug 402 is disposed at the other end of the first charging cable 4. The first USB plug 401 may be disposed in the first receptacle 1101 and connected with the second USB interface 1305, and the first charging plug 402 may be disposed in the second receptacle 1102.

A third receptacle 1201 extending through the housing is disposed at one end of the second receiving groove 12, and a first USB interface 1304 connecting with the first PCB 13 is disposed in the third receptacle 1201. A fourth receptacle 1202 is disposed at the other end of the second receiving groove 12. A second charging cable 5 is placed within the second receiving groove 12. A second USB plug 501 is disposed at one end of the second cable 5, while a second charging plug 502 is disposed at the other end of the second cable 5. The second USB plug 501 may be disposed in the third receptacle 1201 and connected with the first USB interface 1304, and the second charging plug 502 may be disposed in the fourth receptacle 1202.

Still more particularly, a first supporting arm 403 is disposed at the end of the first charging cable 4 that is provided with the first charging plug 402, and one end of the first supporting arm 403 is located below the first charging plug 402, as shown in FIG. 3. Further, a first clamping notch 1103 is disposed at the end of the first receiving groove 11 that is close to the second receptacle 1102. When the first charging cable 4 is not used, the first supporting arm 403 is placed in the first clamping notch 1103. A second supporting arm 503 is disposed at the end of the second charging cable 5 that is provided with the second charging plug 502, and one end of the second supporting arm 503 is located below the second charging plug 502. Further, a second clamping notch 1203 is disposed at the end of the second receiving groove 12 that is close to the fourth receptacle 1202. When the second charging cable 5 is not used, the second supporting arm 503 is placed in the second clamping notch 1203. When the first charging cable 4 or the second charging cable 5 is used, the first charging plug 402 is supported by the first supporting arm 403 so that the first charging plug 402 is connected with a charging interface of the external device in the horizontal direction, and the second charging plug 502 is supported by the second supporting arm 503 so that the second charging plug 502 is connected with the charging interface of the external device in the horizontal direction, thereby facilitating to the connection between the charging plug and the charging interface without twisting the first charging cable 4 or the second charging cable 5, thus prolonging the service life thereof.

In an implementation, the visual effect considerations, an indicator light 6 connecting with the first PCB 13 is disposed at the lateral side of the housing to indicate a charging state of the mobile power supply. The indicator light 6 may be configured to indicate electricity in the mobile power supply in two colors, in this case, when the indicator light 6 is turned on in blue, it is indicated that the mobile power supply is fully charged, and when the indicator light 6 is turned on in red, it is indicated that the mobile power supply is still being charged, thus the state of the mobile power supply can be clearly and accurately understood for proper operations. Further, an electricity volume indicating means may be disposed at the third recess 303, and is operable to emit light passing through the third recess 303 in particular, in the present embodiment for example, the electricity volume in the mobile power supply may be indicated at the third recess 303 by sectors, that is, the third recess 303 is divided into four sectors each representing 25% of the full electricity capacity of the mobile power supply, thus, when the mobile power supply has been fully charged, the four sectors are lightened forming just a complete circle. In this way, the electricity volume in the mobile power supply can be easily known to decide whether to continue charging of the mobile power supply or not.

In the present embodiment, the indicator light 6 is disposed opposite to the micro USB interface 10, thus making better use of the lateral side of the housing without interference, and enhancing a symmetrical effect of the appearance of the mobile power supply. The upper shell 1, the first PCB 13 and the lower shell 2 are connected together by first screws 15. In particular, in the present embodiment, a plurality of first connecting holes 101 are formed in the upper shell 1, a plurality of third connecting holes 1301 corresponding to first connecting holes 101 are formed in the first PCB 13, and a plurality of second connecting holes 202 corresponding to first connecting holes 101 are formed in the lower shell 2, so that the first screws 15 sequentially pass through the first connecting, holes 101 and the third connecting holes 1301 and are screwed into the second connecting holes 202 from top to bottom, thereby detachably connecting the upper shell 1, the first PCB 13 and the lower shell 2.

In order to protrude the first conductive pole 7 and the second conductive pole 8, holes are formed in the first recess 301 and the second recess 302 at the upper cover 3 as well as the first protrusion 901 and the second protrusion 902 on the lower cover 9, a first via hole 102 corresponding to the first recess 301 and a second via hole 103 corresponding to the second recess 302 are formed in the upper cover 1, a third via hole 1302 corresponding to the first via hole 102 and a fourth via hole 1303 corresponding to the second via hole 103 are formed in the first PCB 13, and a fifth via hole corresponding to the first via hole 102 and a sixth via hole corresponding, to the second via hole 103 are formed in the lower shell 2, so that the first conductive pole 7 sequentially passes through the first recess 301, the first via hole 102, the third via hole 1302 and the fifth via hole from top to bottom, and the second conductive pole 8 sequentially passes through the second recess 302, the second via, hole 103, the fourth via hole 1303 and the sixth via hole from top to bottom. Moreover, ends of the first and second conductive poles 7 and 8 protruding respectively from the first and second recesses 301 and 302 are designed, to be hemispherical, and do not protrude beyond the external surface of the upper cover 3. Likewise, ends of the first and second conductive poles 7 and 8 protruding respectively into the first and second protrusions 901 and 902 are designed to be columnar and have end surfaces provided with conical grooves, but do not protrude beyond the first and second protrusions 901 and 902. Thereby, when the mobile power supply is placed on a desktop in any way, both ends of any of the first and second conductive poles 7 and 8 are not in contact with the desktop, thus avoiding an electric leakage and ensuring more safely and reliability.

A via hole 104 corresponding to the third recess 303 is formed in the upper shell 1 to match with the third recess 303, correspondingly, a switch 1306 is disposed at the first PCB 13 and the top end of the switch 1306 passes through the via hole 104 to match with the third recess 303. Thereby, the top end of the switch 1306 may be actuated by pressing the surface of the third recess 303, to turn on the mobile power supply.

Moreover, the first PCB 13 is further provided with other modules such as a charging circuit for charging. An receiving hole 105 is formed at the center of the upper shell 1 in order to accommodate these modules. A storage battery 14 is located, between the first PCB 13 and the lower shell 2, and a battery tank 201 is formed at the center of the lower shell 2. In this way, the thickness of the mobile power supply can be effectively reduced, so that the mobile power supply becomes more light and slim, more stylish, and more convenient to carry.

The mobile power supply according to the present disclosure has the following advantages.

1) The mobile power supply has an independent charging system, and hence can be charged via the integrated micro USB interface even if an external charging structure such as the charging base is failed or unavailable; 2) further, springs are disposed at both ends of an of the first conductive pole 7 and the second conductive pole 8, and are sheathed by conductive caps, so that when the first conductive pole 7 and the second conductive pole 8 are brought into contact with contactors of the charging base, the conductive caps are in contact with the contactors of the charging base and automatically pressed, thus the springs are compressed, making the contact between the first and second conductive poles 7, 8 and the contactors tight and reliable, the first conductive pole 7 and the second conductive pole 8 adopt a short-circuit proof design, to avoid any risk of short-circuit between positive and negative contactors even if the mobile power supply is placed on a metal table; 3) the mobile power supply adopts an adsorptive structure, that is, the upper shell 1 and the lower shell 2 are both provided with magnets, so that to plurality of the superimposed mobile power supplies are attracted by each other due to the magnets and hence can be superimposed more reliably, and the superimposed mobile power supplies are more fully contacted by each other, thus making the process of charging the mobile power supplies more stable; 4) the first USB interfaces 1304 and the second USB interface 1305 of the mobile power supply may be designed as two power output interfaces meeting different specifications such as 5V/1 A and 5V/2.1 A, to be compatible with more than 90% of intelligent mobile electronic products currently available on the market; 5) the mobile power supply per se carries the charging cables which are integrated with the mobile power supply, and the charging cable may be designed to include both a USB interface and a Micro USB interface, both a USB interface and an Apple mobile phone charging plug, or both a USB interface and another charging plug other than the Micro USB interface, to be compatible with the most smart mobile electronic products.

The mobile power supply according to the present disclosure may further include a built-in wireless call system, which includes a wireless communication module for long-distance calling service, a control circuit, and a Bluetooth module for communicating with a mobile phone. The wireless communication module and the Bluetooth module are connected with the control circuit, which is in turn connected with the first PCB 13. The system may be connected with an external mobile terminal, such as mobile phones, via the Bluetooth module, then call contents (e.g. service contents such as ordering meals and drinks, paying, a bill, checking out and cleaning) edited by means of an application on the mobile terminal is sent to the control circuit through the Bluetooth module, and the control circuit sends the edited call contents to a service desk via the wireless communication module to achieve self-service, thereby improving the work efficiency and service quality at service establishments and allowing users to more quickly and easily select the desired items or services.

As shown in FIGS. 6 to 9, a charging base for a mobile power supply includes a body 16. A top cover 17 is disposed in an inner chamber of the body 16, and a second PCB 23 is disposed below the top cover 17. A first contactor 18 and a second contactor 19 passing through the top cover 17 are disposed vertically within the body 16. The bottom ends of the first contactor 18 and the second contactor 19 are connected with the second PCB 23, and the top ends of the first contactor 18 and the second contactor 19 form third snap button structures with the top cover 17, respectively.

To charge the mobile power supply 100, the first buckling structures at the bottom of the mobile power supply 100 are engaged with the third snap button structures at the top of the charging base 200, respectively, so that the bottom ends of the first conductive pole 7 and the second conductive pole 8 are connected with the first contactor 18 and the second contactor 19, respectively.

In an implementation, a first recess 1701 and a second recess 1702 each having a conical shape are disposed separately at the external surface of the top cover 17 and the top ends of the first contactor 18 and the second contactor 19 form the third snap button structures with first recess 1701 and second recess 1702, respectively.

Further, in an implementation, a third recess 1703 is disposed at the external surface of the top cover 17, and the first, second and third recesses 1701, 1702 and 1703 are respectively located at three vertexes of a triangle. The third recess 1703 is configured to form a fourth snap button structure matching with the second buckling structure.

In an implementation, a charging interface for connecting with an external power cable 21 is disposed at one side of the body 16, while a power switch button 22 is disposed at another side of the body 16, opposite to the charging interface. The charging interface and the power switch button 22 are both connected. Whit the second PCB 23. A balancing weight 24 is disposed at the inner bottom surface of the body 16 for effectively preventing, the charging base from overturning, thus ensuring the reliable and stable charging. A sliding proof pad is disposed at the bottom of the body 16 for effectively preventing the charging base from sliding, thus ensuring the stable placement of the charging base. Moreover, the balancing weight is selected for the body 16 as desired Magnets are disposed at the insides of the first, second, third and fourth snap button structures as well as the first and second buckling structures, so that the snap button structures may be attracted by the buckling structures for more stable and reliable connections between the snap button structures and the buckling structures.

The charging base, which cooperates with the mobile power supply in the present disclosure, has a simple structure, is easy to use and has a high charging efficiency.

Figure 10:
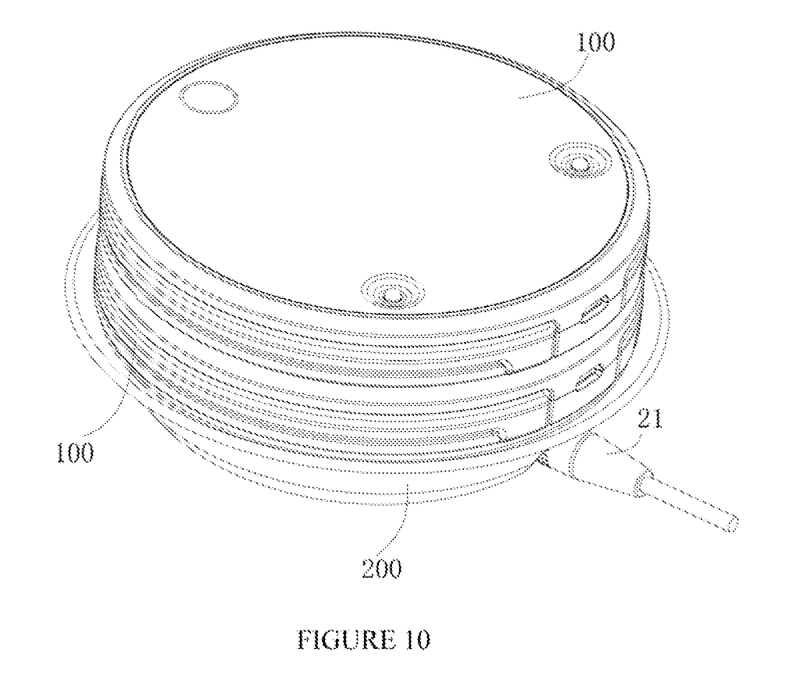
FIG. 10 is a schematic view showing the structure of a superimposed charging platform according to an embodiment of the present disclosure.
Figure 11:
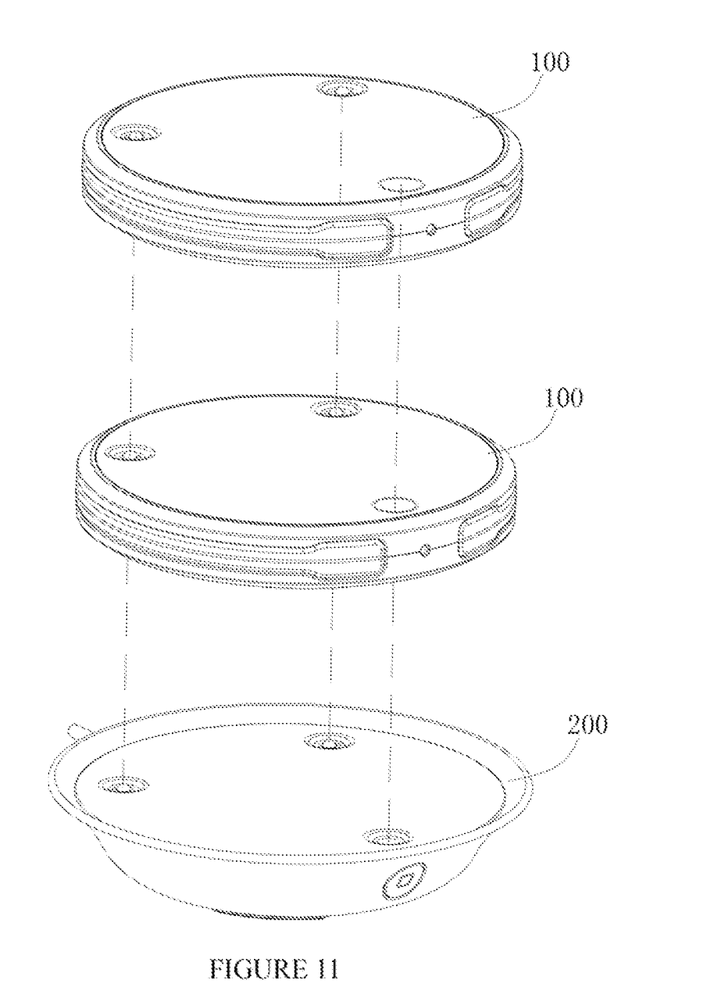
FIG. 11 is a schematic exploded view of the superimposed charging platform shown in FIG. 10.

As shown in FIGS. 10 and 11, a superimposed charging platform includes the charging base 200, and a plurality of the mobile power supplies 100 superimposed on the charging base 200. The first buckling structure and the second buckling structure at the bottom of the underlying mobile power supply 100 are engaged with the third snap button structure and the fourth snap button structure of the charging base 200. Two adjacent mobile power supplies 100 are engaged together by engaging the first buckling structure and the second buckling structure at the bottom of one of the adjacent mobile power supplies 100 with the first snap button structure and the second snap button structure at the top of the other of the adjacent mobile power supplies 100, respectively.

In the superimposed charging platform provided in the present disclosure, the first conductive pole 7 and the second conductive pole 8, which pass through the upper and lower covers 3 and 9 and are both connected with the first PCB 13, are vertically disposed apart from each other within the housing of the mobile power supply 100; the top ends of the first and second conductive poles 7 and 8 form the first snap button structures with the upper cover 3, respectively, the bottom ends of the first and second conductive poles 7 and 8 form the first buckling structures with the lower cover 9, respectively, and the first buckling structures match with the first snap button structures, respectively; the first contactor 18 and the second contactor 19, which pass through the top cover 17, are disposed vertically within the body 16 of the charging base 200, the bottom ends of the first contactor 18 and the second contactor 19 are connected with the second PCB 23, and the top ends of the first contactor 18 and the second contactor 19 form third snap button structures with the top cover 17, respectively; when the mobile power supplies 100 are superimposed and charged on the charging base 200, the first buckling structure and the second buckling structure at the bottom of the underlying mobile power supply 100 are engaged with the third snap button structure and the fourth snap button structure of the charging base 200, two adjacent mobile power supplies 100 are engaged together by engaging the first buckling structure and the second buckling structure at the bottom of one of the adjacent mobile power supplies 100 with the first snap button structure and the second snap button structure at the top of the other of the adjacent mobile power supplies 100, respectively, so that the bottom end of the first conductive pole 7 of the underlying mobile power supply 100 is in contact with the first contactor 18 and the bottom end of the second conductive pole 8 of the underlying mobile power supply 100 is in contact with the second contactor 19, and the adjacent mobile power supplies 100 are connected with each other by the first and second conductive poles 7 and 8. By this way, the simultaneously charging of a plurality of the mobile power supplies is achieved, the mobile power supply may be charged as soon as it is placed on the charging base, and may be used as soon as it has been removed from the charging base, thereby facilitating, greatly its usage; further, the charging platform has a high charging efficiency, and has a simple and compact structure and hence occupies small space. The mobile power supply has a simple structure and a plurality of the mobile power supplies are applicable to be simultaneously charged, resulting in usage convenience. The charging base has a simple structure, is easy to use and has a high charging efficiency. Thereby, the superimposed charging platform, which includes a the charging base and superimposed mobile power supplies for charging, can achieve the simultaneously charging of a plurality of the mobile power supplies at a high charging efficiency, and have a simple and compact structure, and occupy small space.

With the superimposed charging platform, a plurality of the mobile power supplies 100 may be superimposed and simultaneously charged on the charging base 200, with each of the plurality of the mobile power supplies 100 being charged at the identical charging efficiency. The superimposed charging platform, in which the charging base 200 is separable from the mobile power supplies 100, is safe and reliable and has as stable charging efficiency. The simultaneously charging of a plurality of the mobile power supplies can be achieved to solve the problem in the art that the power superimposition scheme is implemented only by an increase of the mobile power supply capacity, but the increase of the mobile power supply capacity prolongs charging time. Compared to the prior art, the charging time is dramatically shortened, and the charging efficiency is enhanced. The number of the superimposed mobile power supplies is improved efficiently and the charging efficiency is high, to solve the problem in the art that the mobile power supply can only be sequentially charged one by one, which results in a long charging time. The magnetic adsorptive structures are adopted so that the contacts between the mobile power supply 100 and the charging base 200 as well as between the mobile power supplies 100 are more reliable when superimposed, and the contactors are more fully contacted to one another, thereby making the charging process more stable. The housing of the mobile power supply 100 is made of environmentally friendly and fireproof material, and is safe and reliable.

The technical principles of the present disclosure have been described as above in combination with the detailed embodiments. The descriptions are intended to explain the principle of the present disclosure without limiting the present disclosure in any way. Based on the explanation, other detailed embodiments, which are readily obtained by those skilled in the art without paying any creative labor, tall within the protection scope of the present disclosure.

The invention claimed is:

1. A mobile power supply, comprising an upper shell (1) and a lower shell (2) which are attached to each other to form a housing of the mobile power supply, and a first PCB (13) and a storage battery (14) connected with the first PCB (13) being disposed within the housing, wherein, an upper cover (3) is provided at the top of the upper shell (1) while a lower cover (9) is provided at the bottom of the lower shell (2), a first conductive pole (7) and a second conductive pole (8), which pass through the upper covers (3) and the lower covers (9) and are both connected with the first PCB (13), are vertically disposed apart from each other within the housing, top ends of the first conductive poles (7) and the second conductive poles (8) form first snap button structures with the upper cover (3), respectively, bottom ends of the first conductive poles (7) and the second conductive poles (7) and (8) form first buckling structures with the lower cover (9), respectively, and the first buckling structures match with the first snap button structures, respectively;

wherein a first recess (301) and a second recess (302) each having a conical shape are disposed separately at an external surface of the upper cover (3), a first protrusion (901) and a second protrusion (902) are disposed at an external surface of the lower cover (9), a top end of the first conductive pole (7) passes through the first recess (301) without protruding from the external surface of the upper cover (3), a top end of the second conductive pole (8) passes through the second recess (302) without protruding from the external surface of the upper cover (3), and the top ends of the first conductive poles (7) and the second conductive poles (8) form the first snap button structures with the first recesses (301) and the second recesses (302), respectively; the bottom end of the first conductive pole (7) passes through the first protrusion (901) without protruding from the first protrusion (901), the bottom end of the second conductive pole (8) passes through the second protrusion (902) without protruding from the second protrusion (902), and the bottom ends of the first conductive poles (7) and the second conductive poles (8) form the first buckling structures with the first protrusions (901) and the second protrusions (902) respectively.

2. The mobile power supply according to claim 1, wherein, a third recess (303) is disposed at the external surface of the upper cover (3), the first recesses (301), the second recesses (302) and the third recesses (303) are respectively located at three vertexes of a triangle, a third protrusion (903), which matches with the third recess (303), is disposed on the external surface of the lower cover (9), the third recess (303) is configured to form a second snap button structure, heat emission holes opening to the external are disposed in the third protrusion (903), and the third protrusion (903) is configured to form a second buckling structure matching with the second snap button structure; and a switch button (1306), a top end of which is corresponding to the third recess (303), is disposed on the first PCB (13).

3. The mobile power supply according to claim 1, wherein, at least two receiving grooves are formed at a lateral side of the housing, two receptacles are respectively disposed at both ends of each receiving groove, a USB interface connecting with the first PCB (13) is disposed within one of the two receptacles at both ends of each of the receiving grooves; a detachable charging cable is disposed within each of the receiving grooves, with both ends of the charging cable being respectively disposed within the corresponding receptacles, and one end of the charging cable is provided with a USB plug configured to connect with the USB interface while the other end of the charging cable is provided with a charging plug adapted to a charging interface of an external device to be charged, a micro USB interface (10), which is adapted to a charging plug of at least one of the charging cables and is configured for charging the mobile power supply, is disposed at the lateral side of the housing, and the micro USB interface (10) is connected with the first PCB (13).

4. The mobile power supply according to claim 3, wherein, an indicator light (6) connecting with the first PCB (13) is disposed at the lateral side of the housing to indicate a charging state of the mobile power supply, the indicator light (6) is disposed opposite to the micro USB interface (10), and the upper shell (1), the first PCB (13) and the lower shell (2) are connected together by first screws (15).

5. The mobile power supply according to claim 3, wherein, a first receiving groove (11) and a second receiving groove (12) are disposed at the lateral side of the housing, a first receptacle (1101) extending through the housing is disposed at one end of the first receiving groove (11), a second USB interface (1305) connecting with the first PCB (13) is disposed in the first receptacle (1101), a second receptacle (1102) is disposed at the other end of the first receiving groove (11), a first charging cable (4) is placed within the first receiving groove (11), a first USB plug (401) is disposed at one end of the first charging cable (4) while a first charging plug (402) is disposed at the other end of the first charging cable (4), the first USB plug (401) is disposed in the first receptacle (1101) and is connected with the second USB interface (1305), and the first charging plug (402) is disposed in the second receptacle (1102);

a third receptacle (1201) extending through the housing is disposed at one end of the second receiving groove (12), and a first USB interface (1304) connecting with the first PCB (13) is disposed in the third receptacle (1201), a fourth receptacle (1202) is disposed at the other end of the second receiving groove (12), a second charging cable (5) is placed within the second receiving groove (12), a second USB plug (501) is disposed at one end of the second cable (5) while a second charging plug (502) is disposed at the other end of the second cable (5), the second USB plug (501) is disposed in the third receptacle (1201) and is connected with the first USB interface (1304), and the second charging plug (502) is disposed in the fourth receptacle (1202).

6. A charging base for the mobile power supply according to claim 1 comprising a body (16), wherein a top cover (17) is disposed in an inner chamber of the body (16), a second PCB (23) is disposed below the top cover (17), a first contactor (18) and a second contactor (19) passing through the top cover (17) are disposed vertically within the body (16), bottom ends of the first contactor (18) and the second contactor (19) are connected with the second PCB (23), and top ends of the first contactor (18) and the second contactor (19) form third snap button structures with the top cover (17), respectively;

the first buckling structures at the bottom of the mobile power supply (100) are configured to engage with the third snap button structures at the top of the charging base (200), respectively, so that the bottom ends of the first conductive pole (7) and the second conductive pole (8) are connected with the first contactor (18) and the second contactor (19), respectively, to charge the mobile power supply (100).

7. The charging base according to claim 6, wherein, a first recess (1701) and a second recess (1702) each having a conical shape are disposed separately at an external surface of the top cover (17), the top ends of the first contactor (18) and the second contactor (19) form the third snap button structures with first recess (1701) and second recess (1702), respectively.

8. The charging base according to claim 7, wherein, a third recess (1703) is disposed at the external surface of the top cover (17), the first recesses (1701), the second recesses (1702) and the third recesses (1703) are respectively located at three vertexes of a triangle, and the third recess (1703) is configured to form a fourth snap button structure;

a charging interface for connecting with an external power cable (21) is disposed at one side of the body (16) while a power switch button (22) is disposed at another side of the body (16), the charging interface and the power switch button (22) are both connected with the second PCB (23), and a balancing weight (24) is disposed at the inner bottom surface of the body (16).

9. A superimposed charging platform comprising a charging base (200) for the mobile power supply according to claim 1 and a plurality of mobile power supplies (100) according to claim 1 superimposed on the charging base (200), wherein a first buckling structure and a second buckling structure at the bottom of the underlying mobile power supply (100) are engaged with the third snap button structure and the fourth snap button structure of the charging base (200), two adjacent mobile power supplies (100) are engaged together by engaging the first buckling structure and the second buckling structure at the bottom of one of the adjacent mobile power supplies (100) with the first snap button structure and the second snap button structure at the top of the other of the adjacent mobile power supplies (100), respectively;

wherein the charging base comprising a body (16), wherein a top cover (17) is disposed in an inner chamber of the body (16), a second PCB (23) is disposed below the top cover (17), a first contactor (18) and a second contactor (19) passing through the top cover (17) are disposed vertically within the body (16), bottom ends of the first contactor (18) and the second contactor (19) are connected with the second PCB (23), and top ends of the first contactor (18) and the second contactor (19) form third snap button structures with the top cover (17), respectively;

the first buckling structures at the bottom of the mobile power supply (100) are configured to engage with the third snap button structures at the top of the charging base (200), respectively, so that the bottom ends of the first conductive pole (7) and the second conductive pole (8) are connected with the first contactor (18) and the second contactor (19), respectively, to charge the mobile power supply (100).

\* \* \* \* \*